United States Patent [19]

Tsuboi

[11] Patent Number: 4,566,577
[45] Date of Patent: Jan. 28, 1986

[54] CLUTCH RELEASE DEVICE FOR MOTORIZED CYCLES

[75] Inventor: Masaharu Tsuboi, Saitama, Japan

[73] Assignee: Honda Giken Kogyo Kabushiki Kaisha, Tokyo, Japan

[21] Appl. No.: 455,519

[22] Filed: Jan. 4, 1983

[30] Foreign Application Priority Data

Jan. 8, 1982 [JP] Japan .................... 57-1417

[51] Int. Cl.⁴ ............................................. F16D 25/08
[52] U.S. Cl. ............................. 192/85 CA; 180/230; 192/91 A; 192/96
[58] Field of Search .............. 192/85 CA, 91 A, 96; 180/230; 74/405; 474/144, 146

[56] References Cited

U.S. PATENT DOCUMENTS

| 1,102,338 | 7/1914 | Jenkins ........................ 474/146 X |
| 2,844,973 | 7/1958 | Hill ................................ 192/96 X |
| 3,283,866 | 11/1966 | Giacosa ............................ 192/96 |
| 3,752,014 | 8/1973 | Holtan ........................ 474/146 X |

FOREIGN PATENT DOCUMENTS

| 850452 | 12/1939 | France ............................ 180/230 |
| 518005 | 3/1955 | Italy ................................ 180/230 |
| 10827 | 2/1981 | Japan .............................. 192/96 |

*Primary Examiner*—Rodney H. Bonck

*Attorney, Agent, or Firm*—Irving M. Weiner; Joseph P. Carrier; John J. Cantarella

[57] ABSTRACT

A clutch release device for a motorized cycle including an engine, at least one rear wheel, a power transmission mechanism for transmitting power of the engine to the rear wheel, and the power transmission mechanism comprising a friction clutch mechanism connected with the engine, a sprocket for chain-driving the rear wheel, a speed change mechanism of a gearing type having a tubular main shaft connected with the clutch mechanism and a counter shaft connected to the sprocket, the main and counter shafts being arranged to be parallel with each other, and the clutch mechanism and the sprocket being disposed on either end side of the main shaft and on the opposite end side of the counter shaft, respectively. The clutch release device comprises a push rod member arranged for advancing and retreating movement through the main shaft, the push rod member having either end portion thereof capable of disconnecting and reconnecting the clutch mechanism as the push rod member advances and retreats, respectively, a hydraulic cylinder acting on the other end portion of the rod member thereby causing same to advance and retreat, and the hydraulic cylinder being disposed more outside than the sprocket in the transverse direction of the motorized cycle. The sprocket mechanism allows for the incorporation of a sprocket of a relatively large diameter.

4 Claims, 5 Drawing Figures

CLUTCH RELEASE DEVICE FOR MOTORIZED CYCLES

BACKGROUND OF THE INVENTION (1) Field of the Invention

The present invention relates to a clutch release device for motorized cycles and, more particularly, to a clutch release device for chain-driven type motorized cycles such as motor-cycles and motorized tricycles.

(2) Description of Relevant Art

Chain-driven type motorized cycles such as motorcycles and motorized tricycles generally include a power transmission mechanism composed of a primary transmission mechanism, a clutch, a speed change gearing, etc. and integrally formed with an engine, in which the speed change gearing has a main shaft and a counter shaft both arranged to extend substantially transversely of the cycle together with a crankshaft of the engine. The main shaft is provided at either end thereof with the clutch of a friction type, and the counter shaft is provided at its the opposite end thereof with a sprocket mechanism for driving a rear wheel driving chain.

As a device for releasing a friction type clutch in such power transmission mechanism, there has been proposed a clutch release device of a hydraulic type in which a push rod member arranged to extend through a tubular main shaft is connected at either end thereof with a pressure plate and provided at the other end thereof with a hydraulic cylinder acting In such clutch release device, however, when it is desired to arrange the hydraulic cylinder on the outside of a crank case supporting the main shaft and a counter shaft at both ends thereof, whereas the hydraulic cylinder has a substantially predetermined volume and the space between the main shaft and the counter shaft is relatively narrow in addition to the requirement for a chain to be stretched near either lateral side of a rear wheel, the hydraulic cylinder is necessarily arranged in a position adjacent a driving sprocket.

When considering the durability of the chain, it is desirable that the sprocket have a relatively large diameter. However, because the hydraulic cylinder is arranged as described above, it is impossible to incorporate a large diameter sprocket.

The present invention effectively overcomes the foregoing problems attendant a conventional clutch release device for motorized cycles.

SUMMARY OF THE INVENTION

According to the present invention there is provided a clutch release device for a motorized cycle including an engine, at least one rear wheel, a power transmission mechanism for transmitting power of the engine to the rear wheel, and wherein the power transmission mechanism comprises a friction clutch mechanism connected with the engine, a sprocket for chain-driving the rear wheel, a speed change mechanism of a gearing type having a tubular main shaft connected with the clutch mechanism and a counter shaft connected to the sprocket, the main and counter shafts being arranged to be substantially parallel with each other, and the clutch mechanism and the sprocket being disposed on either end side of the main shaft and on the opposite end side of the counter shaft, respectively, comprising a push rod member arranged for advancing and retreating movement through the main shaft, the push rod member having either end portion thereof capable of disconnecting and reconnecting the clutch mechanism as the push rod member advances and retreats, respectively, a hydraulic cylinder acting on the other end portion of the rod member so as to thereby cause same to advance and retreat, and the hydraulic cylinder being disposed more remote from the axial center line of the motorized cycle than the sprocket.

An object of the invention is to provide a clutch release device for a motorized cycle of a chain-driven type including a power transmission mechanism having a friction clutch mechanism and a rear wheel driving sprocket mechanism arranged to be transversely opposed to each other with a gearing type speed change mechanism interposed therebetween, in which the sprocket mechanism allows the incorporation of a sprocket of a relatively large diameter.

Another object of the invention is to provide a clutch release device for the above-described type of motorized cycle, which further facilitates disassembly and reassembly, thus assuring favorable maintenance characteristics, and which is advantageous with respect to lubrication.

The above and further features, objects and advantages of the invention will be more fully understood from the following detailed description of preferred embodiments of the invention when the same is read in connection with the accompanying drawings.

DETAILED DESCRIPTION OF PREFERRED EMBODIMENTS

Figure 1:
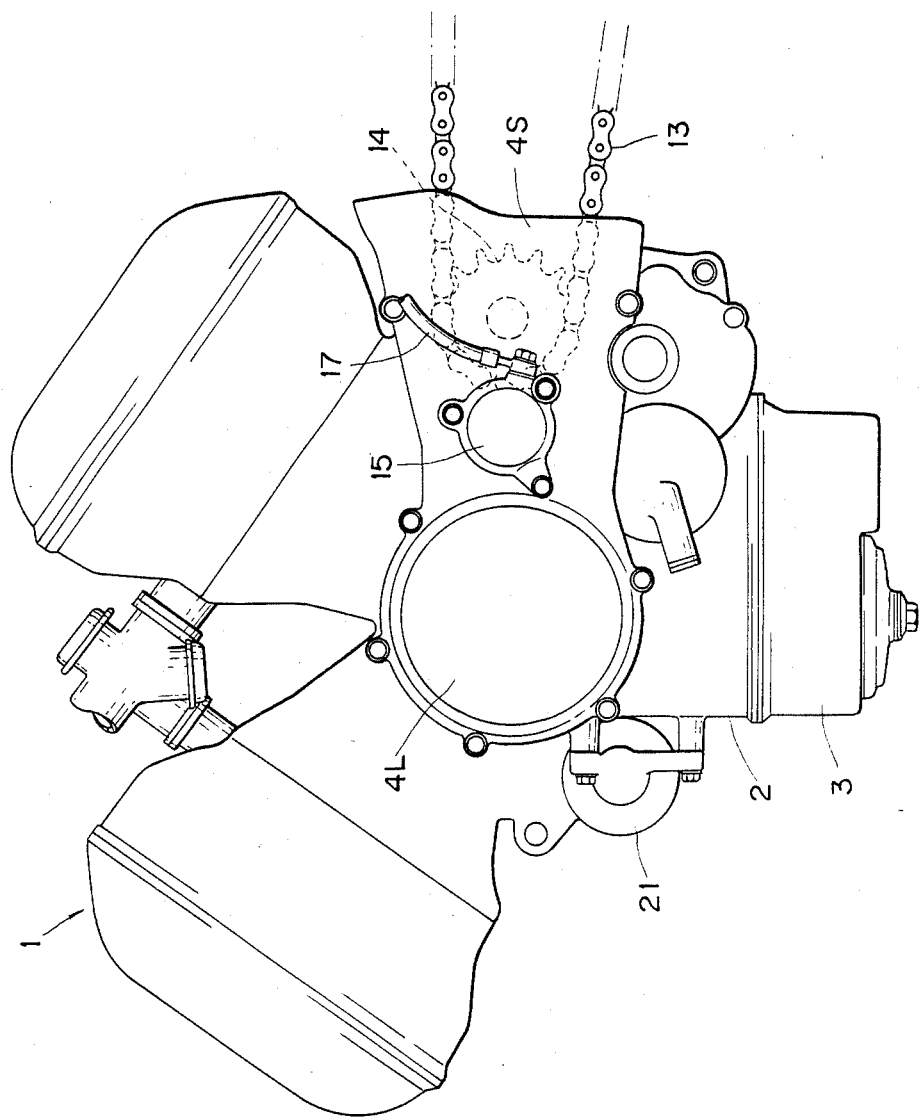
FIG. 1 is a side view of a power transmission mechanism of a motorized cycle having a clutch release device according to a first embodiment of the invention.
Figure 2:
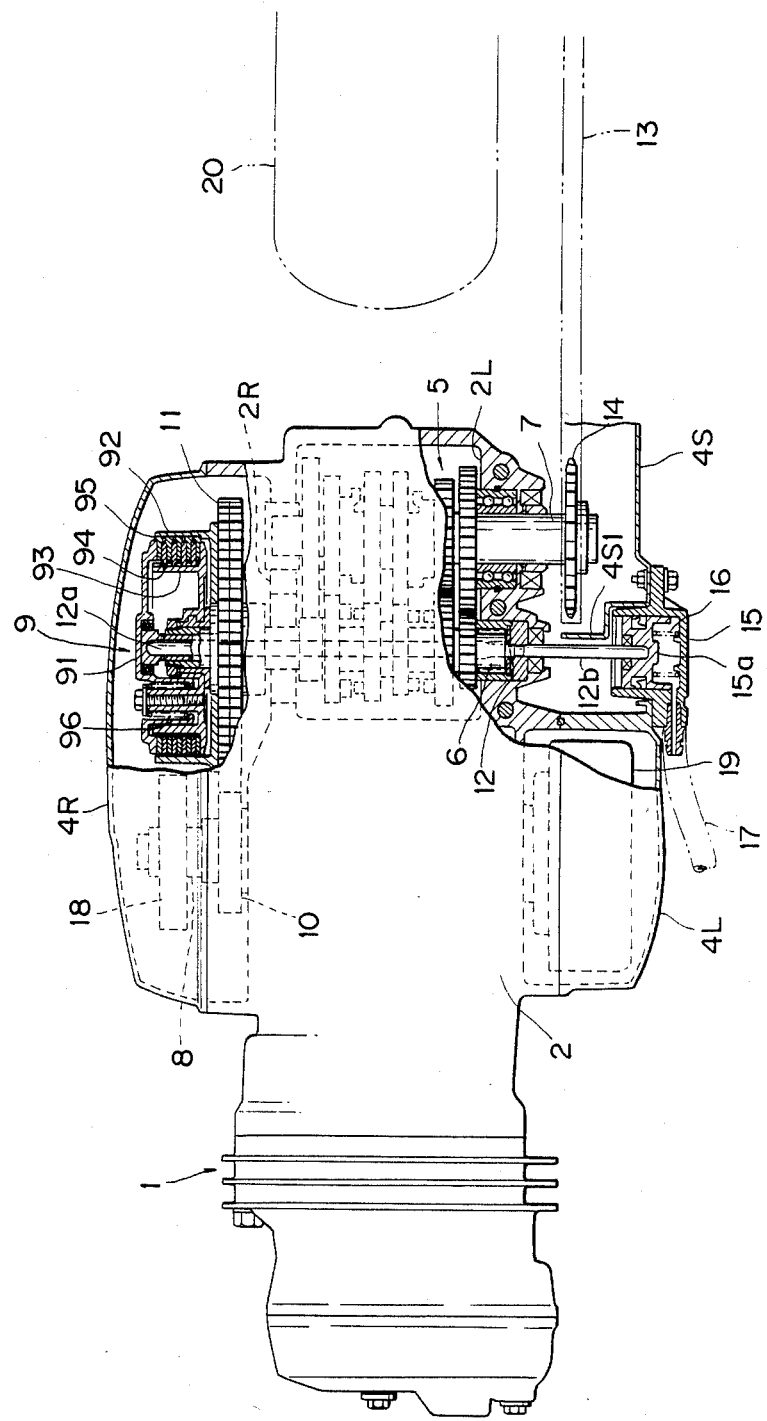
FIG. 2 is a partially cutaway plan view of the power transmission mechanism of FIG. 1.

Referring first to FIGS. 1 and 2, designated by reference numeral 1 is a V-type, 2-cylinder, horizontal internal combustion engine. A crank case 2 simultaneously serves as a transmission case, an oil pan 3 is provided and a pair of right and left removable side covers 4R and 4L are bolted to the crank case 2, the left side cover 4L having a subsidiary chain cover 4S integrally formed therewith.

The crank case 2 includes a pair of side walls 2R, 2L which are opposed to each other with a speed change gearing 5 accommodated therebetween, the gearing 5 having the main and counter shafts 6, 7 thereof born by the side walls 2R, 2L so as to be arranged substantially parallel with a crankshaft 8.

The main shaft 6 is provided at either end thereof with a friction clutch 9, and the power of rotation of the crankshaft 8 is transmitted through gears 10, 11 and the clutch 9 to the main shaft 6.

Provided through the main shaft 6, which is of a tubular configuration, is a clutch releasable push rod 12 which has one end portion 12a thereof coupled with a pressure plate 91 of the clutch 9 and the other end portion 12b projecting outside of the left shaft bearing wall 2L. As known in the art, the clutch 9 includes a clutch outer member 92, a clutch inner member 93, a clutch friction disk 94, a clutch plate 95, a clutch spring 96 and the pressure plate 91.

At the opposite end of the counter shaft 7 relative to the clutch 9, there is provided a sprocket 14 driving a chain 13. The projecting end 12b of the push rod 12 extends beyond a greater distance than the sprocket 14 and is brought into abutment with a piston 15a fitted in a hydraulic cylinder 15 which is fitted from outside into an opening of the cover 4S covering the sprocket 14 and bolted thereto, the hydraulic cylinder 15 being disposed more remote from the axial center line of the motorized cycle than the sprocket 14. The hydraulic cylinder 15 is of a single action piston type in which a coil spring 16 is compressedly provided to be weaker than the clutch spring so as to prevent the piston 15a from tottering while the piston 15 is out of operation. Designated at 17 is a hydraulic impact line for supplying oil pressure to the cylinder 15.

The crankshaft 8 is provided on the outside of the primary transmission gear 10 with a one-way clutch starter motor driving gear 18, and at the opposite end of the crankshaft 8 is provided a generator 19. Designated at, 20 is a rear wheel, 21 is a starter motor, and at $4S_1$ is a partition wall integrally formed with the cover 4S and adapted for the prevention of interference between the push rod end portion 12b and the chain 13.

In the above described arrangement, when a clutch lever (not shown) is operated to transmit oil pressure to the cylinder 15, thereby pushing forward the piston 15a, the push rod 12 will be pushed to advance, shifting the pressure plate 91 and thus disconnecting the clutch 9.

According to the foregoing clutch release device as a first embodiment of the invention, in which the clutch releasing push rod 12 has the extended end portion 12b opposing the clutch 9 and the push rod actuating hydraulic cylinder 15 is fitted to the cover 4S covering the outside of the sprocket 14, while being allowed to act on the push rod end portion 12b, there is obtained a relatively large space between the shaft bearing wall 2L and the hydraulic cylinder 15, which space can serve for allowing the sprocket 14 to have a relatively large diameter, to thereby favorably improve the durability of the chain 13.

Moreover, because the push rod actuating cylinder 15 is disposed more remote from the axial center line of the motorized cycle than the sprocket 14, the internal combustion engine 1 including a power transmission mechanism comprising the above-mentioned arrangement is allowed to have a favorably balanced configuration with respect to the entire width dimension and transverse weight distribution.

Further, because the hydraulic cylinder 15 is supported by the outside cover 4S, when mounting and dismantling the internal combustion engine 1 on and from a frame (not shown) of the motorized cycle, the hydraulic cylinder 15 may be left aside in an assembled state as removed in advance from the cover 4S, thus saving labor such as for disassembling the cylinder 15 and line 17 as well as for venting air. Further, the surroundings are kept from being stained by oil which otherwise may drop out from the cylinder 15, thus facilitating maintenance service.

Figure 3:
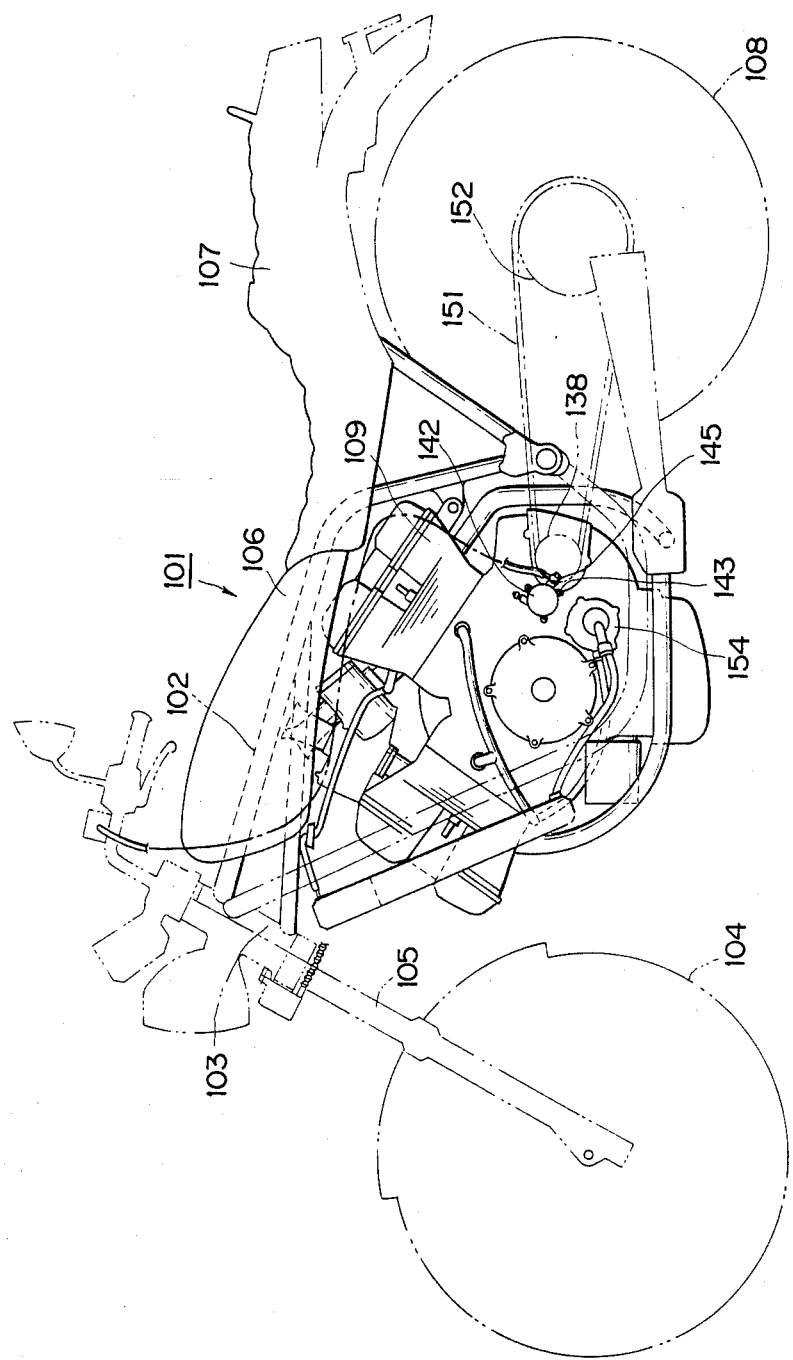
FIG. 3 is a side view of a motorcycle including a power transmission mechanism having a clutch release device according to a second embodiment of the invention.
Figure 4:
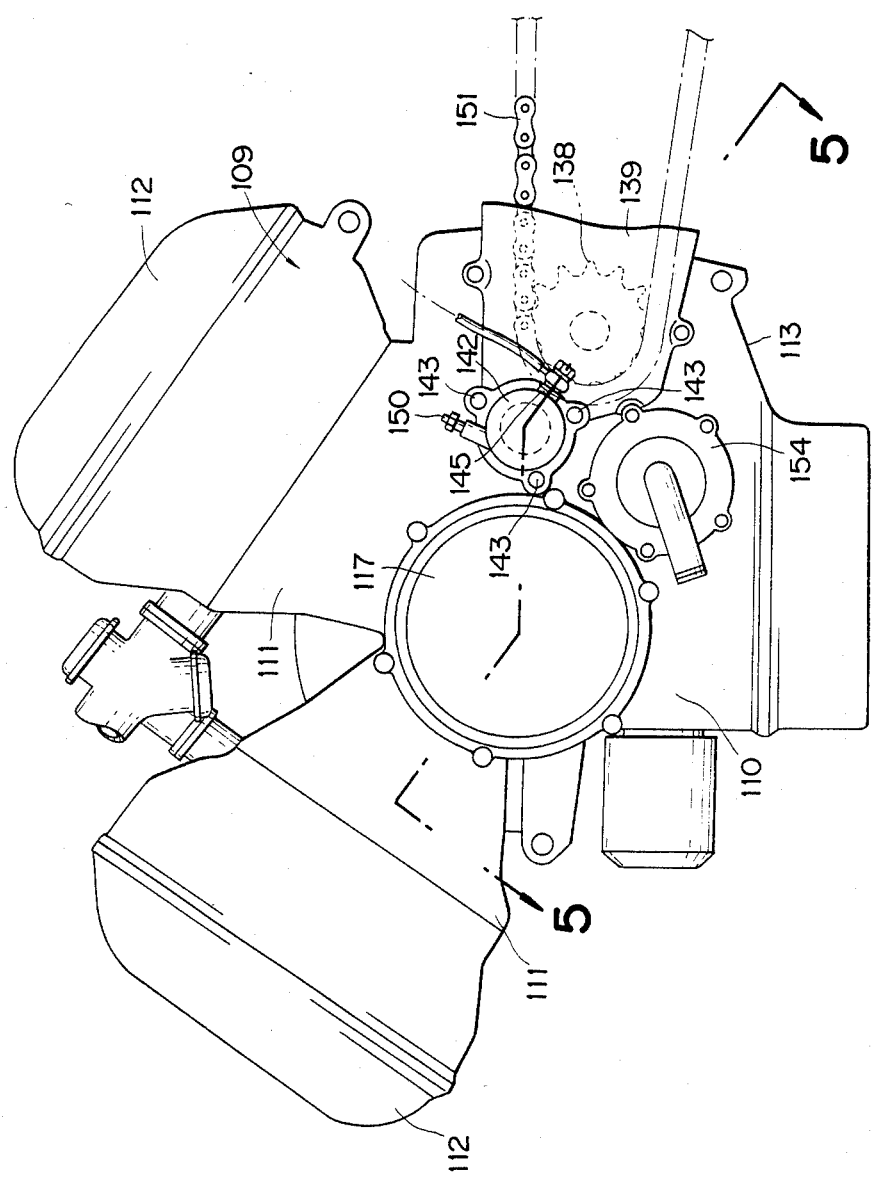
FIG. 4 is an enlarged side view of the power transmission mechanism of FIG. 3.
Figure 5:
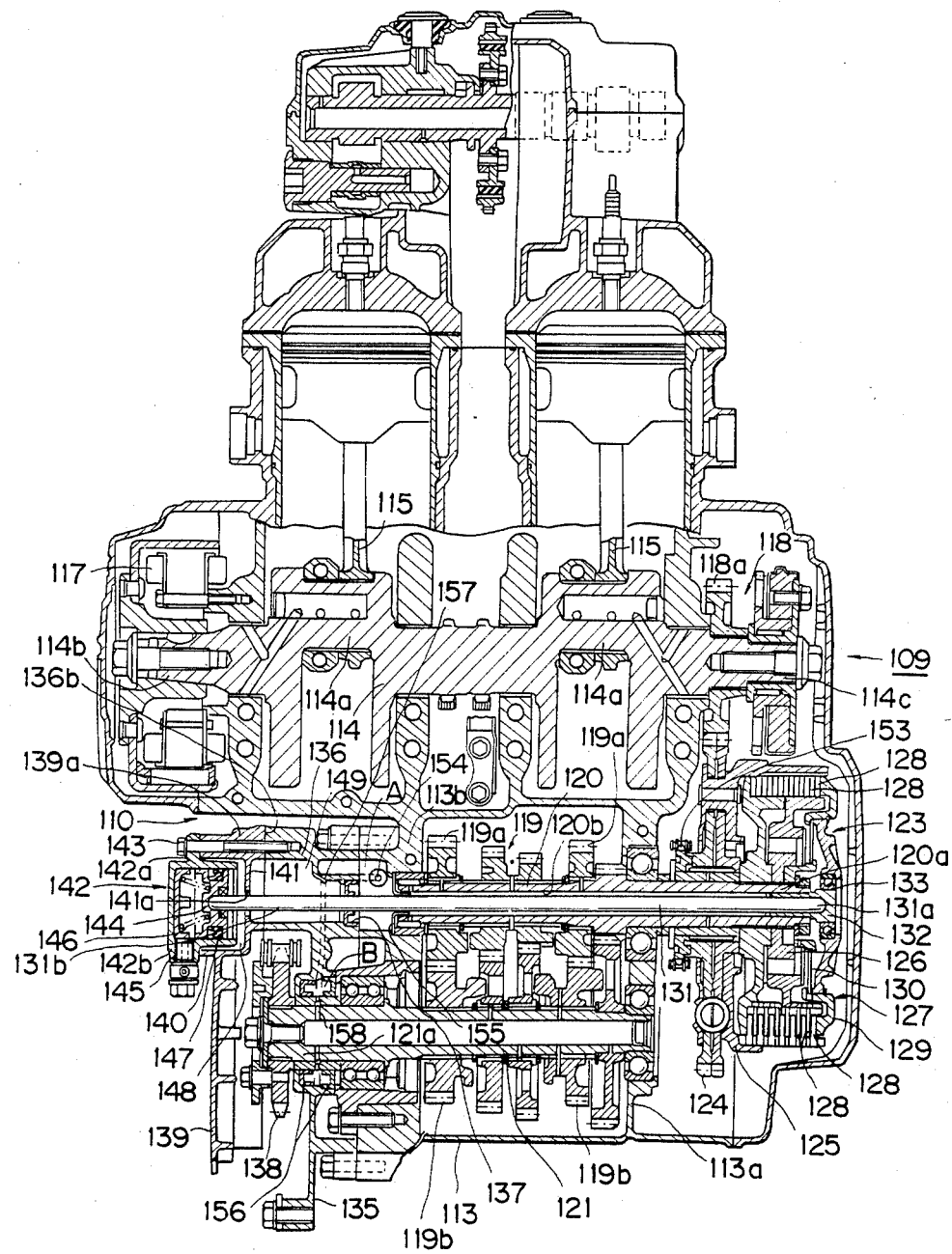
FIG. 5 is a sectional view taken along line 5—5 of FIG. 3.

Referring now to FIGS. 3 to 5, with particular reference to FIG. 3, designated at reference character 101 is a motorcycle. The motorcycle 101 has a frame 102 including at the front end thereof a head tube 103 supporting a front fork 105 in turn supporting a front wheel 104, the frame 102 being provided above the front portion thereof with a fuel tank 106, behind the fuel tank 106 with a driver's seat 107 and at the rearwardly lower portion thereof with a rear wheel 108 as a driving wheel supported by means of a rear fork (not shown).

Under the fuel tank 106, at the front lower portion of the frame 102, there is mounted an engine 109 of a type which is substantially V-shaped in the side view, is horizontally arranged, and has four cylinders disposed with each pair of right and left cylinders on the front and rear, as shown in FIG. 4. It will be understood that in this second embodiment of the invention, the engine 109 may be of any other conventional type.

The engine 109 has a crank case 110, cylinder blocks 111 supported on the crank case 110, and cylinder heads 112 fitted respectively on the cylinder blocks 111, and in this embodiment the crank case 110 has the rear part thereof integrally formed with a transmission case 113.

As shown in FIG. 5, the crank case 110 has a crankshaft 114 transversely arranged and supported thereby, which has a pair of pin portions 114a, 114a connected respectively via connection rods 115, 115 with engine pistons (not shown) slidably fitted in the respective cylinder blocks 111. The crankshaft 114 is provided at one end 114b thereof with an alternating current generator 117 and at the other end 114c thereof with a torque limiter 118 comprising, for example a one-way clutch, etc. In the transmission case 113, there is constituted a speed change mechanism 119 having a main shaft 120 and a counter shaft 121 as an output shaft arranged to be substantially parallel with each other and extending transversely while being supported by the transmission case 113. The main and counter shafts 120, 121 have a plurality of speed change gears 119a, 119b thereof correspondingly provided thereon, thereby permitting the number of revolutions as the output of the counter shaft 121 to be varied with various selectable engagement patterns of the gears 119a, 119b. The transmission case 113 is formed on either transverse side thereof or on the right in FIG. 5 with a partition wall 113a, outside of which the main shaft 120 has one end portion 120a thereof extended and provided therearound with a clutch 123.

On the extended portion 120a of the main shaft 120, there is freely fitted a driven gear 124 engaged with an output gear 118a of the torque limiter 118. The clutch 123 comprises a clutch outer member 125 integrally rotatable with the driven gear 124, a clutch inner member 126 integrally rotatable with the extended shaft portion 120a, and a friction clutch mechanism 127 operatively interposed between the outer member 125 and the inner member 126. This friction clutch mechanism 127 has a plurality of sets of friction plates 128 which establish the connection between the outer and inner members 125, 126 when the main shaft 120 is substantially axially pushed forwardly and disconnect them from each other when the same is released back, a pressure plate 129 for pressing the friction plates 128, and a spring member 130 normally biasing the pressure plate toward the pressing direction. Also shown in FIG. 5 is a sprocket 153 for driving an oil pump (not shown).

The main shaft 120 is formed to be tubular and is provided in the inner diameter portion 120b thereof with a push rod 131 slidably loose-fitted therein, the push rod 131 being joined at the right end 131a thereof in FIG. 5 with a pusher piece 132 slidably fitted in the right end part of the inner diameter portion 120*b*, the pusher piece 132 having the outer end thereof rotatably supporting the central part of the pressure plate 129 by means of a bearing 133.

In the arrangement of FIG. 5, when the push rod 131 is actuated axially rightwardly, thereby pressing the pressure plate 129 axially outwardly, the clutch 123 will be released.

The push rod 131 has an extended portion 131*b* projecting outwardly of the left end part of the inner diameter portion 120*b* of the main shaft 120 and extending outwardly of a left partition wall 113*b* of the transmission case 113, the extended portion 131*b* further extending through a part of and to the outside of a chain guide 135 adapted for serving as a cover wall to cover a left end portion 121*a* of the counter shaft 121, the chain guide 135 being jointed to the outside of the left partition wall 113*b* of the transmission case 113. At the corresponding position with respect to the extended portion 131*b* of the push rod 131, the chain guide 135 has a tubular portion 136 provided on the right end part thereof with an oil seal 137 for sealing in an oil-tight manner the clearance between the base end part of the extended portion 131*b* and the inner circumferential portion of the right end part of the tubular portion 136, so that the inside of the tubular portion 136 is separated by the oil seal 137 from a space, or later described chamber A, partially defined by the left partition wall 113*b* of the transmission case 113. The tubular portion 136 has an inside diameter sufficiently larger than the diameter of the push rod 131 to provide a sufficient space around the push rod 131.

The chain guide 135 is adapted for oil-tightly supporting the left end portion 121*a* of the counter shaft 121 which is projecting outside of the chain guide 135 and provided at the end thereof with a sprocket 138 fixed thereto for driving the rear wheel 108.

The tubular portion 136 of the chain guide 135 is closed at the left end part thereof with an innermost wall 141 of an inwardly recessed portion 140 formed in the base part of a chain cover 139, the innermost wall 141 being formed therethrough with a loose-fit hole 141*a* for admitting therethrough the extended portion 131*b* of the push rod 131. The recessed portion 140 is provided with a tubular cylinder member 142 fitted therein, the cylinder member 142 being open at the distal end part thereof into the recessed portion 140 and having around the outer circumference of the base end part thereof a flanged portion 142*a*. The flanged portion 142*a* is secured by bolts 143 to the transmission case 113, together with the base end 139*a* of the chain cover 139 and the outer wall of the tubular portion 136 of the chain guide 135. As shown in FIG. 5, the tubular portion 136 of the chain guide 135 and the recessed portion 140 of the chain cover 139 are separable from each other along a cut face 136*b*.

The cylinder member 142 has a piston 144 slidably fitted therein and connected with the outer end of the extended portion 131*b* of the push rod 131, an oil hole 145 formed through an outer end wall 142*b* of the cylinder member 142, a spring 146 interposed between the inner surface of the outer end wall 142*b* and the back of the piston 144, and an oil seal 147 fitted on the axially central part of the piston 144. In FIG. 5, between the right side of the piston 144 and the innermost wall 141 of the recessed portion 140 there is defined a first space 148 which is substantially enclosed as well as a second space 149 defined between the innermost wall 141 and the oil seal 137 of the tubular portion 136.

In the above arrangement, when the piston 144 is surged rightwards in FIG. 5 with oil pressure introduced through the oil hole 145 from a clutch operating master cylinder (not shown), the first space 148 which is in communication with the atmosphere through an air vent 150 extending substantially upwardly as shown in FIG. 4 will function as an air gap to assure the action of the piston 144, which action will cause the push rod 131 to advance, thereby releasing the clutch 123.

The transmission case 113 has lubricant sealed with the oil seal 137, although not completely, and partially leaking into the second space 149, in which the leaked oil is stagnant on the bottom. On the other hand, the piston 144 has pressure oil acting thereon which may leak through the clearance between the piston 144 and the cylinder member 142 into the first space 148, in which the leaked oil is stagnant on the bottom. However, the first and second spaces 148, 149 are partitioned by the innermost wall 141 from each other effectively so as to prevent the leaked oils from mixing with each other, so that no more than the oil seal 137 located on the side of the partition wall 113*b* of the transmission case 113 is necessary as an oil seal to completely shut off the lubricant and the pressure oil with respect to each other.

In FIGS. 3 and 4, designated at 151 is a chain for interconnecting the driving sprocket 138 on the side of the transmission case 113 with a driven sprocket 152 on the side of the rear wheel 108.

Referring again to FIG. 5, designated at 154 is an oil hole for supplying the lubricant from the oil pump into an oil chamber A defined by the tubular portion 136 of the chain guide 135 and the transmission case 113. The lubricant as supplied through the oil hole 154 is fed inside the main shaft 120 with a feeding rate adjusted by means of a clearance provided between the push rod 131 and a guide plate 155 fitted on the push rod 131. On the other hand, between the chain guide 135 and the left end portion 121*a* of the counter shaft 121, there is defined another oil chamber B sealed with a pair of oil seals 156, the oil chamber B being supplied with the lubricant through an oil passage 157 branched from upstream of the oil hole 154, the lubricant being fed inside the counter shaft 121 through a pair of oil holes 158 opened in the tubular counter shaft 121.

Further, as will be apparent from FIG. 5, the chain guide 135 is adapted for simultaneously serving as a spacer wall member interposed between the transmission case 113 and the chain cover 139 supporting the extended portion 131*b* of the push rod 131 extending outwardly of the transmission case 113. According to this embodiment, therefore, by intentionally shaping the chain guide 135 as a detachable spacer member, many advantages can be achieved such as the relatively facilitated addition of various functions such as those served by the oil chambers A, B, as well as favorable maintenance.

Still further, as shown in FIGS. 3 and 4, the oil hole 145 of the cylinder member 142 is directed obliquely downwards.

In the foregoing embodiments of the invention, the description is related to an internal combustion engine of a motorcycle. In this respect, it will be understood that the vehicle may be any other type of motorized cycle. Likewise, the type of engine is not limited to and may be other than that shown in the accompanying drawings.

I claim:

1. A clutch release device for a motorized cycle including an engine, at least one rear wheel, transmission means for transmitting the power of said engine to said rear wheel, and said transmission means comprising a friction clutch mechanism connected with said engine, a sprocket for chain-driving said rear wheel, a speed change mechanism of a gearing type having a tubular main shaft connected with said clutch mechanism and a counter shaft connected to said sprocket, said main shaft and said counter shaft being arranged to be substantially parallel with each other, and said clutch mechanism and said sprocket being disposed on either end side of said main shaft and on the opposite end side of said counter shaft, respectively, comprising:
- a push rod member arranged for advancing and retreating movement through said main shaft;
- said push rod member having either end portion thereof adapted to release said clutch mechanism as said push rod member advances or retreats;
- a hydraulic cylinder acting on the other end portion of said rod member, thereby causing same to advance or retreat;
- said hydraulic cylinder being disposed more remote from the axial center line of said motorized cycle than said sprocket;
- said power transmission means having a chain cover member covering the outside of said sprocket;
- said hydraulic cylinder being supported by said chain cover member;
- said speed change mechanism having a transmission case member bearing respective both end portions of said main shaft and said counter shaft;
- said chain cover member being disposed so as to be spaced from said transmission case member with a spacer member sandwiched therebetween;
- said spacer member comprising a chain guide substantially covering the inside of said sprocket;
- said chain guide having a tubular portion;
- said push rod member having an extended end portion extending through said tubular portion to outside of said chain guide member; and
- said hydraulic cylinder being arranged to act on the distal end of said extended end portion.

2. A clutch release device according to claim 1, wherein: said tubular portion of said chain guide is formed so as to define, together with a partition wall portion of said transmission case member, a first lubricant chamber around said extended end portion of said push rod member.

3. A clutch release device according to claim 2, wherein: said chain guide has a sealed portion having a projected end portion of said counter shaft rotatably fitted therein; said sealed portion is formed so as to define a second lubricant chamber around said projected end portion; and said first lubricant chamber is in communication with said second lubricant chamber through an oil passage formed at least partially in said chain guide.

4. A clutch release device for a motorized cycle including an engine, at least one rear wheel, and transmission means for transmitting the power of said engine to said rear wheel; said transmission means comprising a friction clutch mechanism connected with said engine, a sprocket for chain-driving said rear wheel, a chain cover member covering the outside of said sprocket, and a speed change mechanism of a gearing type; said speed change mechanism having a transmission case member, a tubular main shaft containing said transmission case member and connected with said clutch mechanism, and a counter shaft connected to said sprocket; said main shaft and said counter shaft being arranged to be substantially parallel with each other, and said clutch mechanism and said sprocket being disposed on either end side of said main shaft and on the opposite end side of said counter shaft, respectively, comprising:
- a push rod member arranged for advancing and retreating movement through said main shaft;
- said push rod member having one end portion thereof adapted to release said clutch mechanism as said push rod member advances or retreats, and the other end portion thereof projecting out of said transmission case member and extending beyond said sprocket;
- an oil seal member fitted over said push rod member for sealing oil in said transmission case member;
- a hydraulic cylinder acting on said other end portion of said push rod member, thereby causing same to advance or retreat;
- said hydraulic cylinder being supported by said chain cover member and disposed more remote from the axial center line of said motorized cycle than said sprocket so as to define a space for said sprocket between said transmission case member and said hydraulic cylinder;
- said transmission case member bearing respective both end portions of said main shaft and said counter shaft;
- said chain cover member being disposed so as to be spaced from said transmission case member with a spacer member sandwiched therebetween; and
- said spacer member has a hole through which said push rod extends, and said oil seal member is attached to said spacer member.

* * * * *